(12) United States Patent
Anderson et al.

(10) Patent No.: US 9,204,016 B2
(45) Date of Patent: Dec. 1, 2015

(54) IN-PROCESS COLOR MANAGEMENT SYSTEM AND METHOD FOR DIGITAL COLOR PRINTING

(75) Inventors: Henry Anderson, Medford, OR (US); Ben Ziwa, Medford, OR (US)

(73) Assignee: CONSOLIDATED GRAPHICS, INC., Houston, TX (US)

( * ) Notice: Subject to any disclaimer, the term of this patent is extended or adjusted under 35 U.S.C. 154(b) by 640 days.

(21) Appl. No.: 13/208,079

(22) Filed: Aug. 11, 2011

(65) Prior Publication Data
US 2013/0038884 A1    Feb. 14, 2013

(51) Int. Cl.
G06K 9/00    (2006.01)
G06K 1/00    (2006.01)
G03F 3/08    (2006.01)
H04N 1/46    (2006.01)
H04N 1/60    (2006.01)

(52) U.S. Cl.
CPC ............ H04N 1/603 (2013.01); H04N 1/6036 (2013.01)
USPC ........... 358/1.9; 358/504; 358/3.23; 358/529; 347/131; 347/243; 382/167

(58) Field of Classification Search
CPC ..... H04N 1/6033; H04N 1/60; H04N 1/6058; G06K 9/00; G09G 5/02; G09G 5/06
USPC .................. 358/1.9, 523, 2.1, 524, 529, 518; 382/167, 162
See application file for complete search history.

(56) References Cited

U.S. PATENT DOCUMENTS

| | | | |
|---|---|---|---|
| 5,937,087 A * | 8/1999 | Sasanuma et al. | 382/167 |
| 6,222,639 B1 * | 4/2001 | Suzuki | 358/1.9 |
| 6,917,445 B2 * | 7/2005 | Kuno et al. | 358/1.9 |
| 6,995,870 B2 | 2/2006 | Holub | |
| 7,019,867 B2 * | 3/2006 | Kuwata et al. | 358/1.9 |
| 7,126,718 B1 * | 10/2006 | Newman et al. | 358/1.9 |
| 7,274,489 B2 * | 9/2007 | Yamada | 358/1.9 |
| 7,312,897 B2 | 12/2007 | Holub | |
| 7,411,697 B2 * | 8/2008 | Kuno | 358/1.9 |
| 7,710,560 B2 | 5/2010 | Holub | |
| 7,729,008 B2 | 6/2010 | Holub | |
| 7,791,761 B2 | 9/2010 | Holub | |
| 7,821,526 B2 * | 10/2010 | Nagata et al. | 347/131 |
| 7,830,546 B2 | 11/2010 | Holub | |
| 7,880,942 B1 * | 2/2011 | Phillips et al. | 358/518 |
| 7,978,366 B2 * | 7/2011 | Ming | 358/1.9 |
| 8,018,633 B2 | 9/2011 | Kuno | |
| 8,102,566 B2 | 1/2012 | Hatori | |
| 8,279,236 B2 | 10/2012 | Holub | |
| 8,520,262 B2 * | 8/2013 | Li et al. | 358/3.24 |
| 8,537,357 B2 | 9/2013 | Holub et al. | |
| 8,638,340 B2 | 1/2014 | Holub | |

(Continued)

OTHER PUBLICATIONS

United States Patent and Trademark Office, "Final Office Action", issued in connection with U.S. Appl. No. 13/739,870, mailed on Oct. 15, 2014, 45 pages.

(Continued)

Primary Examiner — Akwasi M Sarpong
(74) Attorney, Agent, or Firm — Hanley, Flight & Zimmerman, LLC (57) ABSTRACT

A system and method according to which the color performance of a digital color print job is monitored or otherwise managed during the production run of the digital color print job.

11 Claims, 4 Drawing Sheets

(56) References Cited

U.S. PATENT DOCUMENTS

| | | |
|---|---|---|
| 8,760,704 B2 | 6/2014 | Holub |
| 8,817,314 B2 | 8/2014 | Holub |
| 8,917,394 B2 | 12/2014 | Holub |
| 2002/0036787 A1 | 3/2002 | Kondo |
| 2003/0103222 A1* | 6/2003 | Kato et al. ............. 358/1.9 |
| 2003/0202192 A1* | 10/2003 | Kuwata et al. ............. 358/1.9 |
| 2005/0213128 A1 | 9/2005 | Imai et al. |
| 2007/0268357 A1* | 11/2007 | Nagata et al. ............. 347/243 |
| 2010/0097669 A1* | 4/2010 | Roscoe et al. ............. 358/504 |
| 2010/0231936 A1* | 9/2010 | Nagai ............. 358/1.9 |
| 2013/0128289 A1 | 5/2013 | Sawatzki et al. |
| 2013/0135686 A1 | 5/2013 | Abe et al. |

OTHER PUBLICATIONS

United States Patent and Trademark Office, "Office Action", issued in connection with U.S. Appl. No. 13/739,870, mailed on Apr. 23, 2014, 50 pages.

United States Patent and Trademark Office, "Notice of Allowance", issued in connection with U.S. Appl. No. 13/739,870, mailed on Dec. 19, 2014, 53 pages.

United States Patent and Trademark Office, "Notice of Allowance," issued in connection with U.S. Appl. No. 13/739,870, mailed on Aug. 17, 2015, 22 pages.

\* cited by examiner

IN-PROCESS COLOR MANAGEMENT SYSTEM AND METHOD FOR DIGITAL COLOR PRINTING

BACKGROUND

The present disclosure relates in general to digital color printing, and in particular to a system and method for monitoring or otherwise managing the color performance of a digital color print job in process, that is, during the production run of the digital color print job.

DETAILED DESCRIPTION

Figure 1:
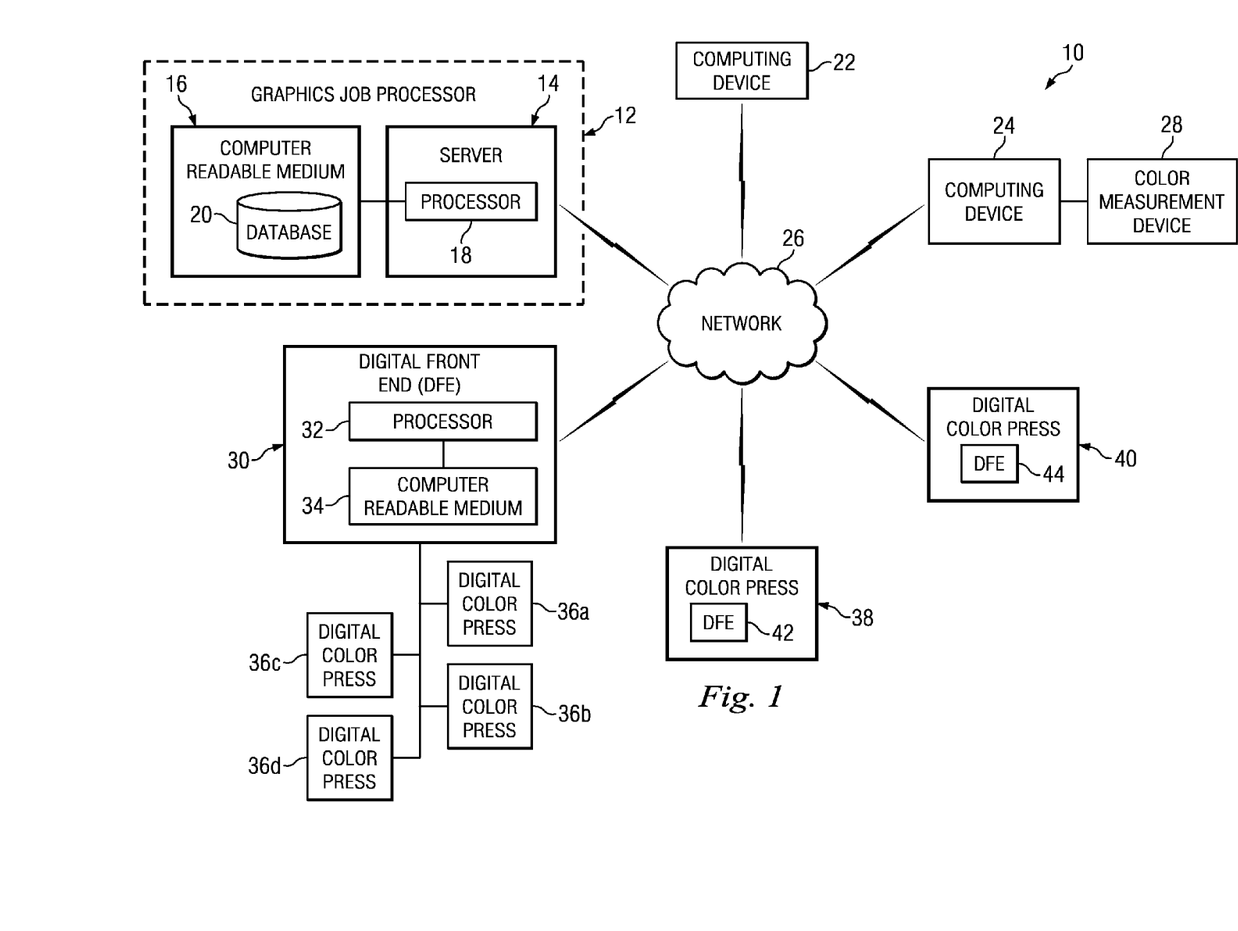
FIG. 1 is a diagrammatic illustration of a system according to an exemplary embodiment, the system including a plurality of computing devices, a color measurement device, and a plurality of digital color presses.

In an exemplary embodiment, as illustrated in FIG. 1, a digital process control system ("Digital PCS") for managing the color performance of a digital print job in process, that is, during the production run of the digital print job, is generally referred to by the reference numeral 10. The system 10 includes a graphics job processor 12, which includes a server 14 and a computer readable medium 16. The server 14 includes a computer processor 18, which is operably coupled to the computer readable medium 16. Instructions accessible to, and executable by, the processor 18 are stored on the computer readable medium 16. A database 20 is also stored on the computer readable medium 16.

Computing devices 22 and 24 are operably coupled to, and in communication with, the server 14 via a network 26. A color measurement device 28 is operably coupled to, and in communication with, the computing device 24. In an exemplary embodiment, the color measurement device 28 is operably coupled to, and in communication with, the computing device 24 via the network 26. A digital front end (DFE) 30 is operably coupled to, and in communication with, the server 14 via the network 26. The digital front end 30 includes a processor 32 and a computer readable medium 34 operably coupled thereto. Instructions accessible to, and executable by, the processor 32 are stored on the computer readable medium 34. Digital color presses 36a, 36b, 36c and 36d are operably coupled to, and in communication with, the digital front end 30. Digital color presses 38 and 40 are operably coupled to, and in communication with, the server 14 via the network 26. The digital color presses 38 and 40 include on-board digital front ends (DFEs) 42 and 44, respectively. The digital front end 30 at least partially controls the digital color presses 36a, 36b, 36c and 36d, and the digital front ends 42 and 44 at least partially control the digital color presses 38 and 40, respectively.

In an exemplary embodiment, the server 14 is a file server/job processor with a stand-alone application. In an exemplary embodiment, the server 14 is a web application server, which in several exemplary embodiments includes and/or executes one or more web-based computer programs, Intranet-based computer programs, and/or any combination thereof. In an exemplary embodiment, the network 26 includes the Internet, one or more local area networks, one or more wide area networks, one or more cellular networks, one or more wireless networks, one or more voice networks, one or more data networks, one or more communication systems, and/or any combination thereof.

In several exemplary embodiments, one or more of the components of the system 10 and/or content stored therein, and/or any combination thereof, are part of, and/or are distributed throughout, the system 10 and/or one or more other components thereof. In several exemplary embodiments, the platforms of the system 10 are identical, different, or vary with respect to equipment, peripherals, hardware architecture and/or specifications, software architecture and/or specifications, and/or any combination thereof.

Figure 2:
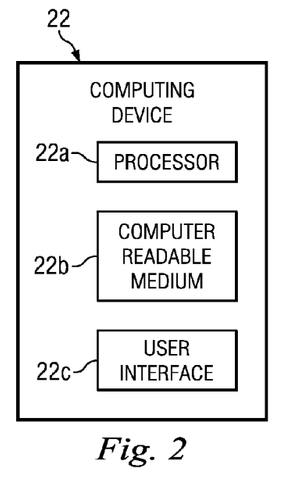
FIG. 2 is a diagrammatic illustration of one of the computing devices of FIG. 1, according to an exemplary embodiment.

In an exemplary embodiment, as illustrated in FIG. 2 with continuing reference to FIG. 1, the computing device 22 includes a processor 22a and a computer readable medium 22b operably coupled thereto. Instructions accessible to, and executable by, the processor 22a are stored on the computer readable medium 22b. The computing device 22 further includes a user interface 22c, which is provided in whole or in part by the processor 22a's execution of the instructions stored on the computer readable medium 22b, and/or the operation of one or more output devices such as, for example, a multi-touch screen or other graphical display, and one or more input devices such as, for example, a keyboard, a mouse or other pointing device, or a pin pad. In an exemplary embodiment, the computing device 22 is a thin client and the server 14 controls at least a portion of the operation of the computing device 22. In an exemplary embodiment, the computing device 22 is a thick client, and/or functions as both a thin client and a thick client. In several exemplary embodiments, the computing device 22 is a workstation, personal computer, portable computer, smartphone, personal digital assistant (PDA), cell phone, another type of computer system, and/or any combination thereof.

In an exemplary embodiment, the computing device 24 is identical to the computing device 22 and thus also includes a processor and a computer readable medium operably coupled thereto; the computing device 24 will not be described in further detail. In several exemplary embodiments, one of the computing devices 22 and 24 can be omitted in favor of the other of the computing devices 22 and 24. In several exemplary embodiments, the computing device 22 is combined in whole or in part with the computing device 24.

In an exemplary embodiment, color management software is loaded on the computing device 24. In an exemplary embodiment, the color management software is stored on the computer readable medium of the computing device 24. In an exemplary embodiment, the color management software loaded on the computer device 24 and/or stored on the computer readable medium thereof is, includes, or is part of, Fuji Taskero color management software/system, which is available from FUJIFILM North America Corporation, Valhalla, N.Y., and/or Maxwell color management software/system, which is available from CHROMiX, Inc., Seattle, Wash.

Figure 3:
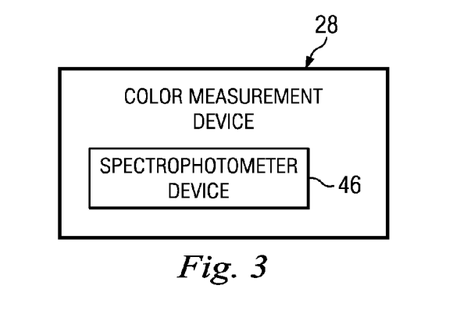
FIG. 3 is a diagrammatic illustration of the color measurement device of FIG. 1, according to an exemplary embodiment.

In an exemplary embodiment, as illustrated in FIG. 3 with continuing reference to FIGS. 1 and 2, the color measurement device 28 is, or includes, a spectrophotometer device 46. In an exemplary embodiment, the spectrophotometer device 46 is, includes, or is part of, an Eye-One iSis (or i1iSis) automated chart reader, which is available from X-Rite, Incorporated, Grand Rapids, Mich. In an exemplary embodiment, the spectrophotometer device 46 is, includes, or is part of, an Eye-One iO (or i1iO) automatic chart reading system, which is also available from X-Rite, Incorporated.

Figure 4:
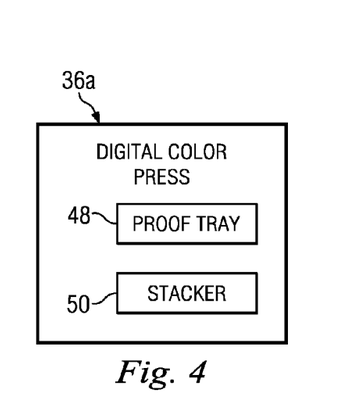
FIG. 4 is a diagrammatic illustration of one of the digital color presses of FIG. 1, according to an exemplary embodiment.

In an exemplary embodiment, as illustrated in FIG. 4 with continuing reference to FIGS. 1-3, the digital color press 36a includes a proof tray 48 and a stacker 50. Color targets are adapted to be printed to the proof tray 48, under conditions to be described below. Color print jobs are adapted to be printed to the stacker 50, under conditions to be described below. Although not shown in the figures, the digital color presses 36b, 36c and 36d also include corresponding ones of the proof tray 48 and the stacker 50. In an exemplary embodiment, one or more of the digital color presses 36a, 36b, 36c and 36d is an HP Indigo Press, which is available from Hewlett-Packard Company, Palo Alto, Calif. In an exemplary embodiment, the digital front end 30 (FIG. 1) is an HP Ultra Scalable Rip Solution (SRS) DFE, which is also available from Hewlett-Packard Company, and each of the digital color presses 36a, 36b, 36c and 36d is an HP Indigo Press. In an exemplary embodiment, one or more of the digital color presses 36a, 36b, 36c and 36d is a Xeikon 6000, which is available from Xeikon International BV, Belgium. In an exemplary embodiment, the digital front end 30 (FIG. 1) is a Xeikon DFE, which is also available from Xeikon International BV, and each of the digital color presses 36a, 36b, 36c and 36d is a Xeikon 6000.

In an exemplary embodiment, although not shown in the figures, the digital color presses 38 and 40 further include corresponding ones of the proof tray 48 and the stacker 50, in addition to including the on-board digital front ends 42 and 44, respectively, as noted above. In an exemplary embodiment, each of the digital color presses 38 and 40 is a NexPress Digital Color Production Color Press, which is available from Eastman Kodak Company, Rochester, N.Y.

Figure 5:
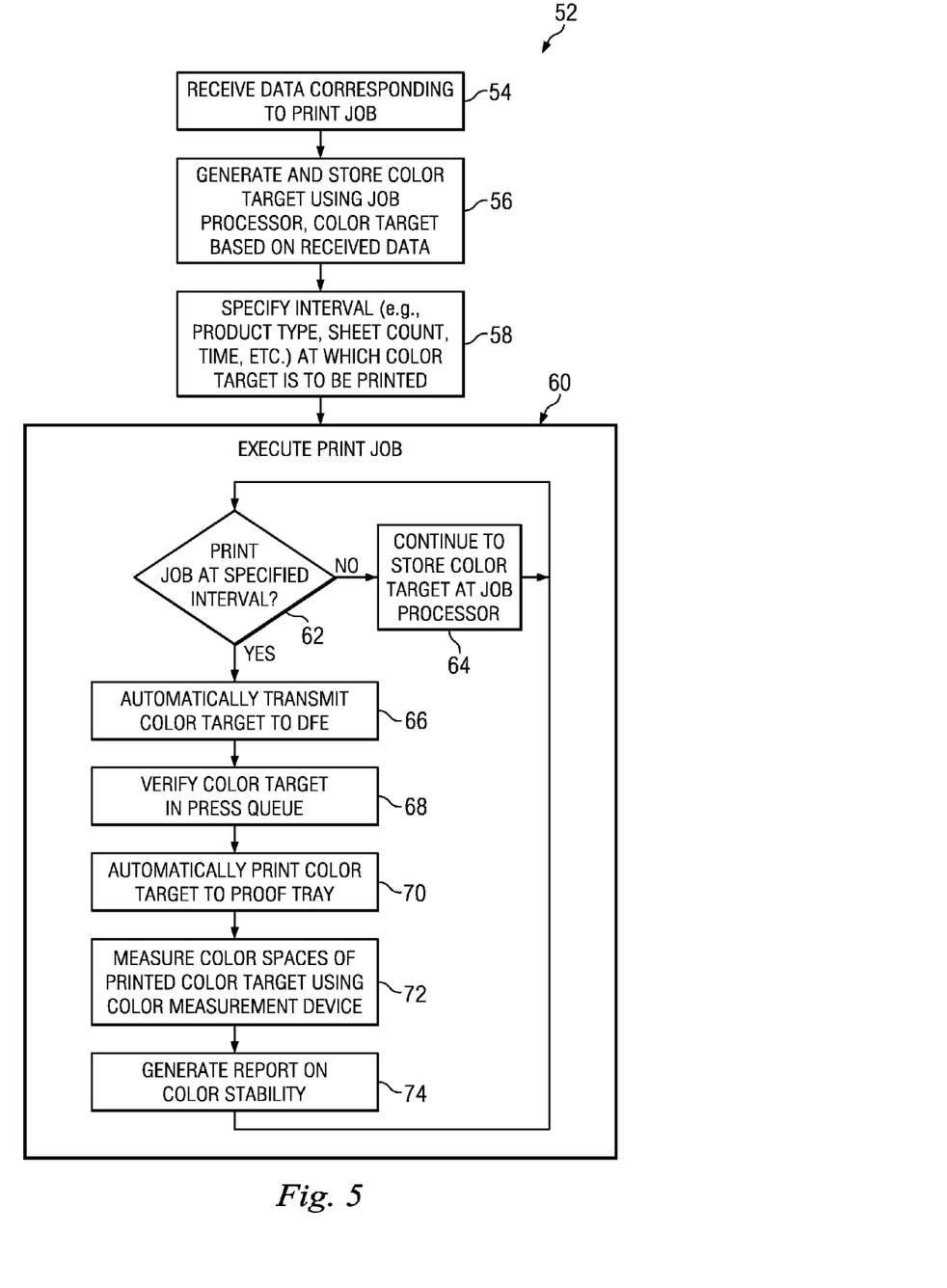
FIG. 5 is a flow chart illustration of a method of operating the system of FIG. 1, according to an exemplary embodiment.

In an exemplary embodiment, as illustrated in FIG. 5 with continuing reference to FIGS. 1-4, a method of operating the system 10 is generally referred to by the reference numeral 52. In several exemplary embodiments, the method 52 is implemented in whole or in part using the graphics job processor 12, the computing device 22, the computing device 24, the color measurement device 28, the digital front end 30, the digital color presses 36a, 36b, 36c, 36d, 38 and 40, and/or any combination thereof.

As shown in FIG. 5, the method 52 includes a step 54, at which data corresponding to a color print job is received. In an exemplary embodiment, to receive the data at the step 54, one or more portable document format (pdf) files containing the color print job are received by the graphics job processor 12, and the pdf files are stored in the database 20. In an exemplary embodiment, the data received at the step 54 may be variable data and/or data for a single job with multiple alike prints.

Before, during or after the step 54, at step 56 a color target is generated and stored using the job processor 12, the color target being based on the data received in the step 54. In an exemplary embodiment, the color target generated at the step 56 includes one or more color spaces such as, for example, red-green-blue (RGB) color spaces, or cyan-magenta-yellow-black (CMYK) color spaces. In an exemplary embodiment, the color target generated at the step 56 provides target(s) for specific color profile(s) with specific tolerance(s), and/or includes one or more color space profiles, tolerances, DFE setups, etc. In an exemplary embodiment, to generate the color target at the step 56, job processing software is executed using one or more of the processors 18 and 22a, and the job processing software is used to generate and store the color target. In an exemplary embodiment, the job processing software used at the step 56 is stored in whole or in part on the computer readable medium 16 and/or the computer readable medium 22b. In an exemplary embodiment, the job processing software used at the step 56 is dependent upon the customer, client, entity or person who supplied the data received at the step 54, as well as on the print job itself, including aspects or parameters thereof. In an exemplary embodiment, at the step 56, the generated color target is stored in whole or in part in the database 20, the computer readable medium 16, the computer readable medium 22b, and/or any combination thereof.

In an exemplary embodiment, at the step 56, a press lead opens or otherwise executes the job processing software in order to generate and store the color target. Alternatively, in an exemplary embodiment, at the step 56, the color target is automatically generated and stored in response to receiving the data corresponding to the print job at the step 54.

Before, during or after the step 56, at step 58 an interval at which the color target is to be printed is specified. In an exemplary embodiment, to specify the interval at the step 58, the interval is determined based on one or more factors such as, for example, product type, sheet count, time, etc. In an exemplary embodiment, the interval specified at the step 58 is a certain sheet count or number of sheets (e.g., 500 sheets) for one product type (such as a book, pamphlet, magazine, manual, etc.), and is another number of sheets (e.g., 250 sheets) for another product type. In an exemplary embodiment, the interval specified at the step 58 is a time interval such as, for example, thirty minutes, one hour, one day, etc. In an exemplary embodiment, the interval is automatically specified at the step 58 in response to receiving the data corresponding to the print job at the step 54. In an exemplary embodiment, the step 58 is combined with the step 56 and thus the interval at which the color target is to be printed is specified during the generation of the color target in the step 56.

Before, during or after the step 58, at step 60 the color print job, to which the data received at the step 54 corresponds, is executed. In an exemplary embodiment, to execute the print job at the step 60, print job data, which is the data received at the step 54, and/or data based thereon, is transmitted from the server 14 to one of the digital front ends 30, 42 and 44. If the server 14 transmits the print job data to the digital front end 30, the digital front end 30 processes the print job data and operates to cause one of the presses 36a, 36b, 36c and 36d to begin to print the color print job and thus print sheets of material in color to the corresponding stacker 50. If the server 14 transmits the print job data to the digital front end 42 or 44, the digital front end 42 or 44 processes the print job data and operates to cause the press 38 or 40, respectively, to begin to print the color print job and thus print sheets of material in color to the corresponding stacker 50.

Before, during or after the step 60, it is determined at step 62 whether the print job is at the interval specified in the step 58. For example, if the interval specified in the step 58 is a sheet count interval of 500 sheets, it is initially determined at the step 62 whether the 500$^{th}$ sheet of the print job has been printed since the initiation of the execution of the print job at the step 60. And at any subsequent executions of the step 62, it is determined whether 500 sheets have been printed since the previous instance it was determined at the step 62 that the print job was at the interval specified in the step 58. For another example, if the interval specified in the step 58 is a time interval of five minutes, it is determined at the step 62 whether five minutes have elapsed since the initiation of the execution of the print job at the step 60. And at any subsequent executions of the step 62, it is determined whether five minutes have elapsed since the previous instance it was determined at the step 62 that the print job was at the interval specified in the step 58.

If it is determined at the step 62 that the print job is not yet at the interval specified at the step 58, the storage of the generated color target in whole or in part at the job processor 12 is continued, as indicated by step 64. The steps 62 and 64 are repeated until it is determined at the step 62 that the print job is indeed at the interval specified at the step 58. In several exemplary embodiments, the step 62 can be executed using a clock, and/or a counter, with the count value provided by the counter being compared with the interval specified at the step 58. In an exemplary embodiment, the clock and/or counter is controlled by, and/or is part of, the server and/or the processor 18 thereof.

If it is determined at the step 62 that the print job is at the interval specified at the step 58, then the color target is automatically transmitted at step 66 to the digital front end 30, 42 or 44 to which the print job data was transmitted in order to initiate execution of the step 60. The digital front end 30, 42 or 44 places the color target in the press queue for the digital color press 36*a*, 36*b*, 36*c*, 36*d*, 38 or 40 being used to execute the print job at the step 60. The digital front end 30, 42 or 40 shows the color target as in the press queue and ready to print.

During or after the step 66, the presence of the color target in the press queue is verified at step 68. In an exemplary embodiment, verification is made at the step 68 by a press operator. In an exemplary embodiment, verification is automatically made at the step 68 as a result of the digital front end 30, 42 or 44 automatically sending a notification to the server 14 and/or to the computing device 22, thereby confirming the automatic transmission of the color target.

Before, during or after the step 68, the color target is automatically printed to the corresponding proof tray 48 at step 70. In an exemplary embodiment, after the color target has been automatically printed to the proof tray 48 at the step 70, the press operator may verify the print quality of the color target, reviewing the color target visually for any press defects that may impact the measurement of the color target (such measurement is to be described below), and/or verifying that all elements of the color target have printed correctly.

During or after the step 70, the color spaces of the printed color target are measured at step 72 using the color measurement device 28. In an exemplary embodiment, the color spaces of the printed color target are measured at the step 72 using the spectrophotometer device 46. In an exemplary embodiment, at the step 72, the printed color target is read by the spectrophotometer device 46 and the results are transmitted to the computing device 24 for processing. In an exemplary embodiment, at the step 72, a press operator measures the color spaces of the printed color target using the spectrophotometer device 46, as well as the color management software loaded on the computing device 24 and/or stored on the computer readable medium thereof.

During or after the step 72, a report on color stability is generated at step 74. In an exemplary embodiment, to generate the color stability report at the step 74, the color management software loaded on the computing device 24, and/or stored on the computer readable medium thereof, compiles and/or otherwise processes the color space measurements taken at the step 72, providing real time reporting on the color stability of the digital color press 36*a*, 36*b*, 36*c*, 36*d*, 38 or 40 being used to execute the print job at the step 60. In an exemplary embodiment, at the step 74, the execution of the color management software loaded on the computing device 24 results in one or more comparisons between the color space measurements taken at the step 72, and target readings to the specified color profile for the print job executed at the step 60, i.e., a reference set of expected color values corresponding to the color profile for the print job executed at the step 60. In an exemplary embodiment, at the step 74, the execution of the color management software loaded on the computing device 24 provides information on color variance of the color space measurements taken at the step 72 using Delta-E (dE) levels, with dE being a unit of measure that calculates and quantifies the difference between two colors, one of which is a reference color and the other is a sample color that attempts to match the reference color (the higher the dE, the greater the difference between the two colors). In an exemplary embodiment, standards for dE variance are preset in the color management software and thus are used at the step 74. In an exemplary embodiment, at the step 74, the execution of the color management software loaded on the computing device 24 results in the generation of a pass/fail notification.

During or after the step 74, the report generated at the step 74 is reviewed by the press operator and/or the press lead. Based on the report generated at the step 74, the press operator and/or the press lead will determine any necessary maintenance routines needed for color correction on press either pre-run or mid-production run based on the output timing of the color target, that is, at the time the color target was printed at the step 70, or at the point the color target was printed at the step 70 during the print job executed at the step 60. In several exemplary embodiments, during or after the step 74, problems with the digital color press 36*a*, 36*b*, 36*c*, 36*d*, 38 or 40 being used to execute the print job at the step 60 are detected; for example, it may be determined that dE is trending upwards on cyan. Accordingly, color adjustments may be made to the digital color press 36*a*, 36*b*, 36*c*, 36*d*, 38 or 40 being used to execute the print job at the step 60. In several exemplary embodiments, during or after the step 74, operators can monitor/view press trends with respect to the digital color press 36*a*, 36*b*, 36*c*, 36*d*, 38 or 40 being used to execute the print job at the step 60, and thus detect early warning signs if the digital color press is beginning to go, or trending, out of tolerance.

After the step 74, the step 62 is again executed, in accordance with the foregoing. In several exemplary embodiments, the steps 62, 64, 66, 68, 70, 72 and 74 are repeated as necessary, in accordance with the foregoing, until the print job executed at the step 60 is completed.

In several exemplary embodiments, the operation of the system 10 or the execution of the method 52 enables the monitoring of the color performance of digital printing during a production run by printing a color target automatically in the run. The operation of the system 10 or the execution of the method 52 allows press color performance to be monitored throughout the printing of the product to ensure color stability and fidelity based on the set color target. The operation of the system 10 or the execution of the method 52 enables the provision of groups of color profiles and preset tools for color management on multiple presses, and different presses, at multiple facilities.

Figure 6:
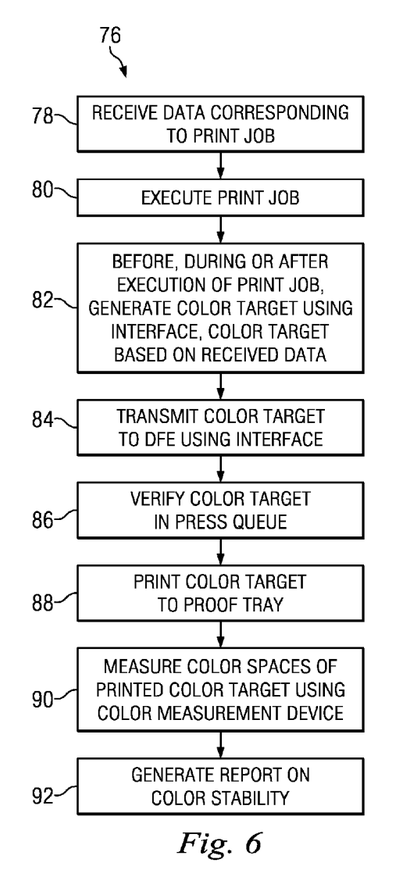
FIG. 6 is a flow chart illustration of a method of operating the system of FIG. 1, according to another exemplary embodiment.

In an exemplary embodiment, as illustrated in FIG. 6 with continuing reference to FIGS. 1-5, a method of operating the system 10 is generally referred to by the reference numeral 76. In several exemplary embodiments, the method 76 is implemented in whole or in part using the graphics job processor 12, the computing device 22, the computing device 24, the color measurement device 28, the digital front end 30, the digital color presses 36a, 36b, 36c, 36d, 38 and 40, and/or any combination thereof.

As shown in FIG. 6, the method 76 includes a step 78, at which data corresponding to a color print job is received. The step 78 of the method 76 is identical to the step 54 of the method 52 and therefore the step 78 of the method 76 will not be described in further detail.

During or after the step 78, at step 80 the color print job, to which the data received at the step 78 corresponds, is executed. The step 80 of the method 76 is identical to the step 60 of the method 52 and therefore the step 80 of the method 76 will not be described in further detail.

Before, during or after the step 80, at step 82 a color target is generated using the user interface 22c of the computing device 22, the color target being based on the data received in the step 78. In an exemplary embodiment, at the step 82, the color target is generated manually using the user interface 22c. In an exemplary embodiment, at the step 82, tab(s) and/or icon(s) forming part of the user interface 22c are selected by, for example, a press lead, and the color target is generated manually using the user interface 22c. In an exemplary embodiment, the color target generated at the step 82 includes one or more color spaces such as, for example, red-green-blue (RGB) color spaces, or cyan-magenta-yellow-black (CMYK) color spaces. In an exemplary embodiment, the color target generated at the step 82 provides target(s) for specific color profile(s) with specific tolerance(s), and/or includes one or more color space profiles, tolerances, DFE setups, etc.

In an exemplary embodiment, to generate the color target at the step 82, job processing software is executed using one or more of the user interface 22c, the processor 18 of the server 14, and the processor 22a of the computing device 22, and the job processing software is used to generate and store the color target. In an exemplary embodiment, the job processing software used at the step 82 is stored in whole or in part on the computer readable medium 16 and/or the computer readable medium 22b. In an exemplary embodiment, the job processing software used at the step 82 is dependent upon the customer, client, entity or person who supplied the data received at the step 78, as well as on the print job itself, including aspects or parameters thereof. In an exemplary embodiment, at the step 82, the generated color target is stored in whole or in part in the database 20, the computer readable medium 16, the computer readable medium 22b, and/or any combination thereof. In an exemplary embodiment, at the step 82, a press lead opens or otherwise executes the job processing software using the user interface 22c in order to generate and store the color target.

During or after the step 82, at step 84 the color target is transmitted to the digital front end 30, 42 or 44 to which the print job data was transmitted in order to initiate execution of the step 80. In an exemplary embodiment, at the step 84, the digital color press 36a, 36b, 36c, 36d, 38 or 40 being used to execute the print job at the step 80 is selected using the user interface 22c, thereby selecting the corresponding digital front end 30, 42 or 44 to which the color target is to be transmitted. During or after the step 84, the digital front end 30, 42 or 44 places the color target in the press queue for the digital color press 36a, 36b, 36c, 36d, 38 or 40 being used to execute the print job at the step 80. The digital front end 30, 42 or 44 shows the color target as in the press queue and ready to print.

During or after the step 84, the presence of the color target in the press queue is verified at step 86. In an exemplary embodiment, verification is made at the step 68 by a press operator. In an exemplary embodiment, verification is automatically made at the step 86 as a result of the digital front end 30, 42 or 44 automatically sending a notification to the server 14 and/or the computing device 22 confirming the transmission of the color target.

Before, during or after the step 86, the color target is printed to the corresponding proof tray 48 at step 88. In an exemplary embodiment, at the step 88, the color target is manually printed, with a press operator selecting to print the color target to the corresponding proof tray 48 using the corresponding digital front end 30, 42 or 44. In an exemplary embodiment, at the step 88, the color target is automatically printed to the corresponding proof tray 48. In an exemplary embodiment, after the color target has been printed to the proof tray at the step 88, the press operator may verify the print quality of the color target, reviewing the color target visually for any press defects that may impact the measurement of the color target (such measurement is to be described below), and/or verifying that all elements of the color target have printed correctly.

During or after the step 88, the color spaces of the printed color target are measured at step 90 using the color measurement device 28. The step 90 of the method 76 is identical to the step 72 of the method 52 and therefore the step 90 of the method 76 will not be described in further detail.

During or after the step 90, a report on color stability is generated at step 92. The step 92 of the method 76 is identical to the step 74 of the method 52 and therefore the step 92 of the method 76 will not be described in further detail.

During or after the step 92, the report generated at the step 92 is reviewed by the press operator and/or the press lead. Based on the report generated at the step 92, the press operator and/or the press lead will determine any necessary maintenance routines needed for color correction on press either pre-run or mid-production run based on the output timing of the color target, that is, at the time the color target was printed at the step 88, or at the point the color target was printed at the step 88 during the print job executed at the step 80. In several exemplary embodiments, during or after the step 92, problems with the digital color press 36a, 36b, 36c, 36d, 38 or 40 being used to execute the print job at the step 80 are detected; for example, it may be determined that dE is trending upwards on cyan. Accordingly, color adjustments may be made to the digital color press 36a, 36b, 36c, 36d, 38 or 40 being used to execute the print job at the step 80. In several exemplary embodiments, during or after the step 92, operators can monitor/view press trends with respect to the digital color press 36a, 36b, 36c, 36d, 38 or 40 being used to execute the print job at the step 80, and detect early warning signs if the digital color press is beginning to go, or trending, out of tolerance.

In several exemplary embodiments, at any time before, during or after the execution of the print job at the step 80, the steps 82, 84, 86, 88, 90 and 92 may be repeated.

In several exemplary embodiments, the operation of the system 10 or the execution of the method 76 enables the monitoring of the color performance of digital printing during a production run by printing a color target during the production run. The operation of the system 10 or the execution of the method 76 allows press color performance to be monitored throughout the printing of the product to ensure color stability and fidelity based on the set color target. The operation of the system 10 or the execution of the method 76 enables the provision of groups of color profiles and preset tools for color management on multiple presses, and different presses, at multiple facilities.

In an experimental exemplary embodiment, before implementing the method 52 or 76, an experimental production run of an experimental digital color print job yielded an experimental average dE level of 2.10. However, in an experimental exemplary embodiment, by implementing the method 52 or 76, an experimental production run of an experimental digital color print job, which was substantially equivalent to the aforementioned experimental digital color print job, yielded an experimental average dE level of 1.79.

Figure 7:
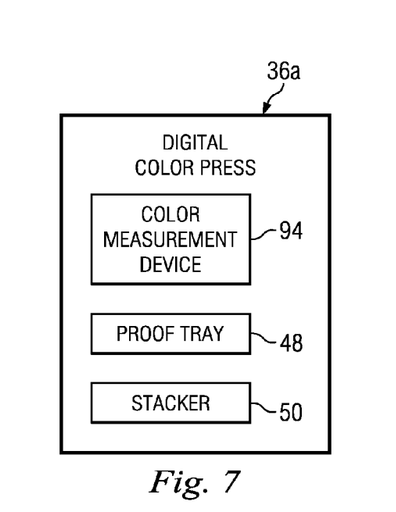
FIG. 7 is a diagrammatic illustration of one of the digital color presses of FIG. 1, according to another exemplary embodiment.

In an exemplary embodiment, as illustrated in FIG. 7 with continuing reference to FIGS. 1-6, the digital color press 36a further includes an inline color measurement device 94, in addition to including respective ones of the proof tray 48 and the stacker 50. In an exemplary embodiment, the inline color measurement device 94 includes, or is part of, the proof tray 48. In an exemplary embodiment, the inline color measurement device 94 is positioned proximate the proof tray 48. In an exemplary embodiment, the inline color measurement device 94 includes the spectrophotometer device 46.

Figure 8:
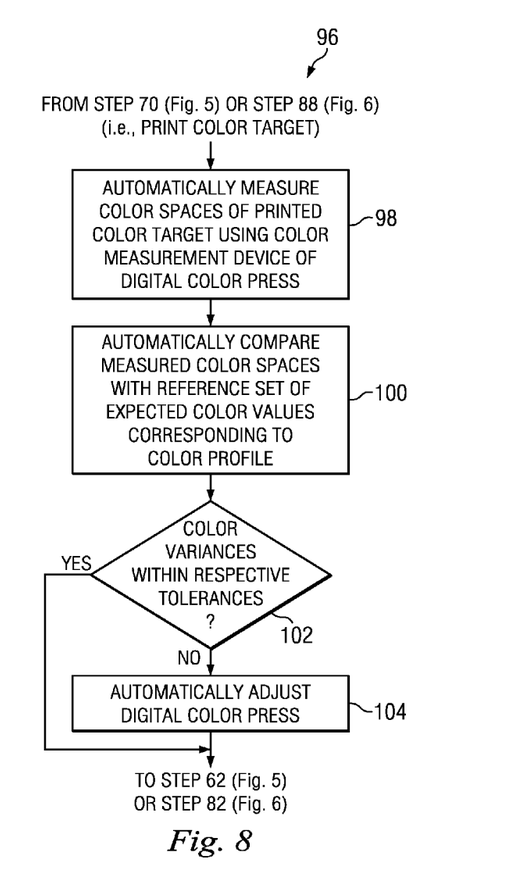
FIG. 8 is a flow chart illustration of a method of operating the system of FIG. 1, including the embodiment of the digital color press shown in FIG. 7, according to an exemplary embodiment.

In an exemplary embodiment, as illustrated in FIG. 8 with continuing reference to FIGS. 1-7, a method of operating the system 10, including the embodiment of the digital color press 36a shown in FIG. 7, is generally referred to by the reference numeral 96.

As indicated in FIG. 8, the method 96 is either a modification of the method 52 shown in FIG. 5, or a modification of the method 76 shown in FIG. 6. These two modifications will be discussed in turn.

In an exemplary embodiment, as indicated in FIG. 8, if the method 96 is a modification of the method 52 shown in FIG. 5, the execution of the method 96 first requires the execution of the steps 54, 56, 58, 60, 62, 64, 66, 68 and 70 of the method 52. After the step 70 of the method 52 has been executed, the continued execution of the method 96 requires the omission of the steps 72 and 74 of the method 52, in favor of the execution of steps 98, 100, 102 and 104, which steps are shown in FIG. 8. That is, instead of executing the steps 72 and 74 during the execution of the method 96, the steps 98, 100 and 102 shown in FIG. 8 are executed, as well as the step 104 if necessary. At the step 98 of the method 96, the color spaces of the color target printed to the proof tray 48 at the step 70 are automatically measured using the inline color measurement device 94. In an exemplary embodiment, at the step 98, the color spaces of the color target are automatically measured using the inline color measurement device 94 during, and/or after, the printing of the color target to the proof tray 48 at the step 70. During or after the step 98, at the step 100 the measured color spaces are automatically compared with a reference set of expected color values corresponding to the color profile for the print job executed at the step 60. During or after the step 100, at the step 102 it is automatically determined whether the color variances between the measured color spaces and the reference set of expected color values are within their respective tolerances. If it is determined at the step 102 that the color variances are not within their respective tolerances, then at step 104 the digital color press 36a is automatically adjusted to correct the color variances. In several exemplary embodiments, the steps 100, 102 and 104 are automatically executed using one or more of the digital front end 30, the job processor 12, the computing device 22, and the computing device 24. During or after the step 104, the steps 62, 64, 66, 68, 70, 98, 100, 102 and 104 are repeated as necessary, in accordance with the foregoing. If it is determined at the step 102 that the color variances are within their respective tolerances, then the steps 62, 64, 66, 68, 70, 98, 100, 102 and 104 are repeated as necessary, in accordance with the foregoing.

As noted above, in an exemplary embodiment, instead of the method 96 being a modification of the method 52 shown in FIG. 5, the method 96 can be a modification of the method 76 shown in FIG. 6. More particularly, as indicated in FIG. 8, if the method 96 is a modification of the method 76 shown in FIG. 6, the execution of the method 96 first requires the execution of the steps 78, 80, 82, 84, 86 and 88 of the method 76. After the step 88 of the method 76 has been executed, the continued execution of the method 96 requires the omission of the steps 90 and 92 of the method 76, in favor of the execution of the steps 98, 100, 102 and possibly 104. That is, instead of executing the steps 90 and 92 during the execution of the method 96, the steps 98, 100 and 102 are executed, as well as the step 104 if necessary. At the step 98 of the method 96, the color spaces of the color target printed to the proof tray 48 at the step 88 are automatically measured using the inline color measurement device 94. In an exemplary embodiment, at the step 98, the color spaces of the color target are automatically measured using the inline color measurement device 94 during, and/or after, the printing of the color target to the proof tray 48 at the step 88. During or after the step 98, at the step 100 the measured color spaces are automatically compared with a reference set of expected color values corresponding to the color profile for the print job executed at the step 80. During or after the step 100, at the step 102 it is automatically determined whether the color variances between the measured color spaces and the reference set of expected color values are within their respective tolerances. If it is determined at the step 102 that the color variances are not within their respective tolerances, then at step 104 the digital color press 36a is automatically adjusted to correct the color variances. In several exemplary embodiments, the steps 100, 102 and 104 are automatically executed using one or more of the digital front end 30, the job processor 12, the computing device 22, and the computing device 24. During or after the step 104, the steps 82, 84, 86, 88, 98, 100, 102 and 104 may be repeated as necessary, in accordance with the foregoing. If it is determined at the step 102 that the color variances are within their respective tolerances, then the steps 82, 84, 86, 88, 98, 100, 102 and 104 may be repeated as necessary, in accordance with the foregoing.

In several exemplary embodiments, instead of, or in addition to using the digital color press 36a, the method 96 may be executed using any of the digital color presses 36b, 36c, 36d, 38 and 40, so long as the digital color press includes an inline color measurement device.

Figure 9:
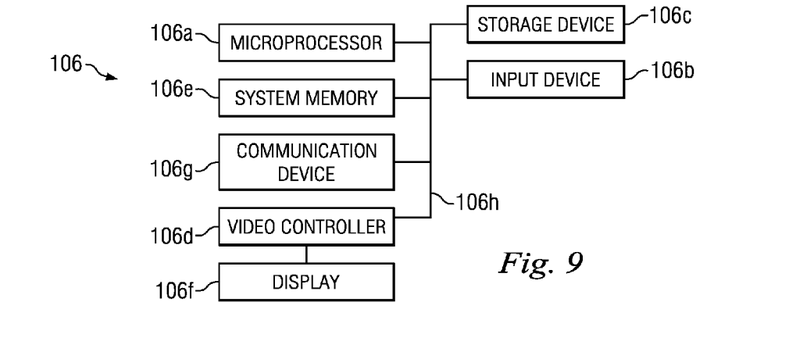
FIG. 9 is a diagrammatic illustration of a node for implementing one or more exemplary embodiments of the present disclosure, according to an exemplary embodiment.

In an exemplary embodiment, as illustrated in FIG. 9 with continuing reference to FIGS. 1-8, an illustrative node 106 for implementing one or more embodiments of one or more of the above-described networks, elements, methods and/or steps, and/or any combination thereof, is depicted. The node 106 includes a processor 106a, an input device 106b, a storage device 106c, a video controller 106d, a system memory 106e, a display 106f, and a communication device 106g, all of which are interconnected by one or more buses 106h. In several exemplary embodiments, the storage device 106c may include a floppy drive, hard drive, CD-ROM, optical drive, any other form of storage device and/or any combination thereof. In several exemplary embodiments, the storage device 106c may include, and/or be capable of receiving, a floppy disk, CD-ROM, DVD-ROM, or any other form of computer readable medium that may contain executable instructions. In several exemplary embodiments, the communication device 106g may include a modem, network card, or any other device to enable the node to communicate with other nodes. In several exemplary embodiments, any node represents a plurality of interconnected (whether by intranet or Internet) computer systems, including without limitation, personal computers, mainframes, PDAs, smartphones and cell phones.

In several exemplary embodiments, one or more of the graphics job processor 12, the computing devices 22 and 24, the color measurement device 28, the digital front ends 30, 42 and 44, the digital color presses 36a, 36b, 36c, 36d, 38 and 40, the inline color measurement device 94, and/or one or more components thereof, is, or at least includes, the node 106 and/or components thereof, and/or one or more nodes that are substantially similar to the node 106 and/or components thereof. In several exemplary embodiments, one or more of the above-described components of one or more of the node 106, the graphics job processor 12, the computing devices 22 and 24, the color measurement device 28, the digital front ends 30, 42 and 44, the digital color presses 36a, 36b, 36c, 36d, 38 and 40, the inline color measurement device 94, and/or one or more components thereof, include respective pluralities of same components.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, the network 26, and/or one or more portions thereof, may be designed to work on any specific architecture. In an exemplary embodiment, one or more portions of the network 26 may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In several exemplary embodiments, a computer program, such as a plurality of instructions stored on a computer readable medium, such as one or more of the computer readable medium 16, the database 20, the computer readable medium 22b, the computer readable medium 34, the system memory 106e, and/or any combination thereof, may be executed by a processor to cause the processor to carry out or implement in whole or in part the operation of the system 10, one or more of the methods 52, 76 and 96, and/or any combination thereof. In several exemplary embodiments, such a processor may include one or more of the processor 18, the processor 22a, the processor 32, the processor 106a, and/or any combination thereof. In several exemplary embodiments, such a processor may execute the plurality of instructions in connection with a virtual computer system.

A method has been described that includes generating a color target, wherein the color target is associated with a print job; specifying an interval at which to print the color target; executing the print job; and during the execution of the print job, automatically printing the color target at the specified interval. In an exemplary embodiment, the specified interval is based on at least one of the following: a time interval, a sheet count interval, and a product type. In an exemplary embodiment, automatically printing the color target at the specified interval during the execution of the print job includes determining whether the print job is at the specified interval; if the print job is at the specified interval, then automatically transmitting the color target to a digital front end; and automatically printing the color target to a proof tray of a digital color press, wherein the digital color press is at least partially controlled by the digital front end. In an exemplary embodiment, the color target has one or more color spaces; and wherein the method further includes measuring the one or more color spaces; and generating a report on color stability based on the measurements of the one or more color spaces. In an exemplary embodiment, the color target has one or more color spaces; wherein the digital color press includes a color measurement device; and wherein the method further includes automatically measuring the one or more color spaces using the color measurement device; automatically comparing the measurements of the one or more color spaces with a reference set of color values to thereby determine one or more color variances; determining whether the one or more color variances are within respective tolerances; and if the one or more color variances are not within the respective tolerances, then automatically adjusting the digital color press.

An apparatus has been described that includes a computer readable medium; and a plurality of instructions stored on the computer readable medium, wherein the plurality of instructions are executable by a processor, and wherein the plurality of instructions includes instructions that cause the processor to generate a color target, wherein the color target is associated with a print job; instructions that cause the processor to specify an interval at which to print the color target; instructions that cause the processor to execute the print job; and instructions that cause the processor, during the execution of the print job, to automatically print the color target at the specified interval. In an exemplary embodiment, the specified interval is based on at least one of the following: a time interval, a sheet count interval, and a product type. In an exemplary embodiment, instructions that cause the processor, during the execution of the print job, to automatically print the color target at the specified interval include instructions that cause the processor to determine whether the print job is at the specified interval; instructions that, if the print job is at the specified interval, cause the processor to automatically transmit the color target to a digital front end; and automatically print the color target to a proof tray of a digital color press, wherein the digital color press is at least partially controlled by the digital front end. In an exemplary embodiment, the color target has one or more color spaces; and wherein the plurality of instructions further includes instructions that cause the processor to measure the one or more color spaces; and instructions that cause the processor to generate a report on color stability based on the measurements of the one or more color spaces. In an exemplary embodiment, the color target has one or more color spaces; wherein the digital color press includes a color measurement device; and wherein the plurality of instructions further includes instructions that cause the processor to automatically measure the one or more color spaces using the color measurement device; instructions that cause the processor to automatically compare the measurements of the one or more color spaces with a reference set of color values to thereby determine one or more color variances; instructions that cause the processor to determine whether the one or more color variances are within respective tolerances; and instructions that, if the one or more color variances are not within the respective tolerances, cause the processor to automatically adjust the digital color press.

A system has been described that includes a server; a digital front end in communication with the server; a digital color press at least partially controlled by the digital front end, the digital color press comprising a stacker to which sheets of a print job are adapted to be printed during the execution of the print job; and a proof tray to which a color target is adapted to be printed, wherein the color target is associated with the print job; a processor, wherein the processor is part of at least one of the server, the digital front end, and the digital color press; and a computer program executable by the processor and stored in at least one of the server, the digital front end, and the digital color press, wherein the computer program, when executed by the processor, causes the color target to be printed to the proof tray during the execution of the print job. In an exemplary embodiment, the color target is automatically printed to the proof tray at a specified interval during the execution of the print job. In an exemplary embodiment, the system further includes a user interface, wherein the color target is generated using the user interface during the execution of the print job. In an exemplary embodiment, the color target has one or more color spaces; and wherein the system further includes a color measurement device adapted to measure the one or more color spaces. In an exemplary embodiment, the color measurement device is part of the digital color press; and wherein the one or more color spaces are automatically measured using the color measurement device during the execution of the print job.

A method has been described that includes receiving data corresponding to a print job; executing the print job using a digital color press, including printing sheets of the print job to a stacker of the digital color process; generating a color target, wherein the color target is based on the received data; transmitting the color target to a digital front end, wherein the digital front end at least partially controls the digital color press; and printing the color target to a proof tray of the digital color press during the execution of the print job. In an exemplary embodiment, the color target has one or more color spaces; and wherein the method further includes measuring the one or more color spaces; and generating a report on color stability based on the measurements of the one or more color spaces. In an exemplary embodiment, the color target has one or more color spaces; wherein the digital color press includes a color measurement device; and wherein the method further includes automatically measuring the one or more color spaces using the color measurement device; automatically comparing the measurements of the one or more color spaces with a reference set of color values to thereby determine one or more color variances; determining whether the one or more color variances are within respective tolerances; and if the one or more color variances are not within the respective tolerances, then automatically adjusting the digital color press. In an exemplary embodiment, the color target is generated using a user interface during the execution of the print job. In an exemplary embodiment, printing the color target to the proof tray of the digital color press during the execution of the print job includes specifying an interval at which to print the color target, wherein the specified interval is based on at least one of the following: a time interval, a sheet count interval, and a product type; during the execution of the print job, determining whether the print job is at the specified interval; during the execution of the print job, if the print job is at the specified interval, then automatically transmitting the color target to a digital front end; and automatically printing the color target to the proof tray of the digital color press, wherein the digital color press is at least partially controlled by the digital front end.

An apparatus has been described that includes a computer readable medium; and a plurality of instructions stored on the computer readable medium, wherein the plurality of instructions are executable by a processor, and wherein the plurality of instructions includes instructions that cause the processor to receive data corresponding to a print job; instructions that cause the processor to execute the print job using a digital color press, including printing sheets of the print job to a stacker of the digital color process; instructions that cause the processor to generate a color target, wherein the color target is based on the received data; instructions that cause the processor to transmit the color target to a digital front end, wherein the digital front end at least partially controls the digital color press; and instructions that cause the processor to print the color target to a proof tray of the digital color press during the execution of the print job. In an exemplary embodiment, the color target has one or more color spaces; and wherein the plurality of instructions further includes instructions that cause the processor to measure the one or more color spaces; and instructions that cause the processor to generate a report on color stability based on the measurements of the one or more color spaces. In an exemplary embodiment, the color target has one or more color spaces; wherein the digital color press includes a color measurement device; and wherein the plurality of instructions further includes instructions that cause the processor to automatically measure the one or more color spaces using the color measurement device; instructions that cause the processor to automatically compare the measurements of the one or more color spaces with a reference set of color values to thereby determine one or more color variances; instructions that cause the processor to determine whether the one or more color variances are within respective tolerances; and instructions that, if the one or more color variances are not within the respective tolerances, cause the processor to automatically adjust the digital color press. In an exemplary embodiment, instructions that cause the processor to print the color target to the proof tray of the digital color press during the execution of the print job include instructions that cause the processor to specify an interval at which to print the color target, wherein the specified interval is based on at least one of the following: a time interval, a sheet count interval, and a product type; instructions that, during the execution of the print job, cause the processor to determine whether the print job is at the specified interval; instructions that, during the execution of the print job and if the print job is at the specified interval, cause the processor to automatically transmit the color target to a digital front end; and automatically print the color target to the proof tray of the digital color press, wherein the digital color press is at least partially controlled by the digital front end.

It is understood that variations may be made in the foregoing without departing from the scope of the present disclosure.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures.

What is claimed is:

1. A method comprising:
providing a digital color press and a digital front end, wherein the digital color press comprises a stacker and a proof tray, and wherein the digital color press is at least partially controlled by the digital front end;
generating a color target, wherein the color target is associated with a print job; specifying an interval at which to print the color target, wherein the specified interval is based on at least one of a time interval and a sheet count interval;
executing the print job so that sheets of the print lob are printed to the stacker of the digital color press: and during the execution of the print job automatically printing the color target at the specified interval that is based on the at least one of the time interval and the sheet count interval;
wherein automatically printing the color target at the specified interval comprises: automatically transmitting the color target to the digital front end;
and automatically printing the color target to the proof tray of the digital color press; wherein at the specified interval the color target is automatically printed to the proof tray during the printing of the sheets of the print lob to the stacker to thereby enable monitoring of color performance of the print lob during the execution thereof;
wherein the color target has one or more color spaces; wherein the digital color press comprises a color measurement device;
and wherein the method further comprises: automatically measuring the one or more color spaces using the color measurement device;
automatically comparing the measurements of the one or more color spaces with a reference set of color values to thereby determine one or more color variances;
determining whether the one or more color variances are within respective tolerances; and if the one or more color variances are not within the respective tolerances, then automatically adjusting the digital color press.

2. The method of claim 1,
wherein the method further comprises:
generating a report on color stability based on the measurements of the one or more color spaces.

3. An apparatus comprising:
a computer readable medium that is non-transitory; and
a plurality of instructions stored on the computer readable medium, wherein the plurality of instructions are is executable by a processor, and wherein the plurality of instructions comprises: instructions that cause the processor to generate a color target, wherein the color target is associated with a print job; instructions that cause the processor to specify an interval at which to print the color target, wherein the specified interval is based on at least one of a time interval and a sheet count interval;
instructions that cause the processor to execute the print job so that sheets of the print job are printed to a stacker of a digital color press; and instructions that cause the processor, during the execution of the print job, to automatically print the color target at the specified interval that is based on the at least one of the time interval and the sheet count interval;
wherein the instructions that cause the processor to automatically print the color target at the specified interval comprise:
instructions that cause the processor to automatically transmit the color target to a digital front end, wherein the digital color press is at least partially controlled by the digital front end; and instructions that cause the processor to automatically print the color target to a proof tray of the digital color press;
wherein, at the specified interval, the color target is automatically printed to the proof tray during the printing of the sheets of the print job to the stacker to thereby enable monitoring of color performance of the print job during the execution thereof;
wherein the color target has one or more color spaces;
wherein the digital color press comprises a color measurement device; and wherein the plurality of instructions further comprises:
instructions that cause the processor to automatically measure the one or more color spaces using the color measurement device;
instructions that cause the processor to automatically compare the measurements of the one or more color spaces with a reference set of color values to thereby determine one or more color variances;
instructions that cause the processor to determine whether the one or more color variances are within respective tolerances; and instructions that if the one or more color variances are not within the respective tolerances, causes the processor to automatically adjust the digital color press.

4. The apparatus of claim 3,
wherein the plurality of instructions further comprises:
instructions that cause the processor to generate a report on color stability based on the measurements of the one or more color spaces.

5. A system comprising:
a server;
a digital front end in communication with the server;
a digital color press at least partially controlled by the digital front end, the digital color press comprising:
a stacker to which sheets of a print job are adapted to be printed during the execution of the print job; and
a proof tray to which a color target is adapted to be printed, wherein the color target is associated with the print job, wherein the color target has one or more color spaces;
wherein the digital color press comprises a color measurement device;

a processor, wherein the processor is part of at least one of the server, the digital front end, and the digital color press; and
a non-transitory computer program executable by the processor and stored in at least one of the server, the digital front end, and the digital color press, wherein the non-transitory computer program, when executed by the processor, causes:
the color target to be automatically transmitted to the digital front end;
the color target to be automatically printed to the proof tray at a specified interval during the execution of the print job;
the one or more color spaces to be automatically measured using the color measurement device;
the measurements of the one or more color spaces to be automatically compared with a reference set of color values to thereby determine one or more color variances;
the determination to be made of whether the one or more color variances are within respective tolerances; and
the digital color press to be automatically adjusted if the one or more color variances are not within the respective tolerances;
wherein the specified interval is based on at least one of a time interval and a sheet count interval; and
wherein, at the specified interval, the color target is automatically printed to the proof tray during the printing of the sheets of the print job to the stacker to thereby enable monitoring of color performance of the print job during the execution thereof.

6. The system of claim 5, further comprising a user interface, wherein the color target is generated using the user interface during the execution of the print job.

7. A method comprising: receiving data corresponding to a print job; executing the print job using a digital color press, comprising printing sheets of the print job to a stacker of the digital color press;
generating a color target, wherein the color target is based on the received data; transmitting the color target to a digital front end, wherein the digital front end at least partially controls the digital color press; and printing the color target to a proof tray of the digital color press during the execution of the print job, comprising:
specifying an interval at which to print the color target, wherein the specified interval is based on at least one of a time interval and a sheet count interval; during the execution of the print job,
determining whether the print job is at the specified interval that is based on the at least one of the time interval and the sheet count interval; and during the execution of the print job, if the print job is at the specified interval then automatically transmitting the color target to the digital front end; and automatically printing, at the specified interval, the color target to the proof tray of the digital color press during the printing of the sheets of the print job to the stacker of the digital color press.
wherein the color target has one or more color spaces;
wherein the digital color press comprises a color measurement device; and wherein the method further comprises: automatically measuring the one or more color spaces using the color measurement device automatically comparing the measurements of the one or more color spaces with a reference set of color values to thereby determine one or more color variances; determining whether the one or more color variances are within respective tolerances; and if the one or more color variances are not within the respective tolerances, then automatically adjusting the digital color press.

8. The method of claim 7, wherein the method further comprises:
generating a report on color stability based on the measurements of the one or more color spaces.

9. The method of claim 7, wherein the color target is generated using a user interface during the execution of the print job.

10. An apparatus comprising a computer readable medium that is non-transitory; and plurality of instructions stored on the computer readable medium, wherein the plurality of instructions are is executable by a processor, and wherein the plurality of instructions comprises: instructions that cause the processor to receive data corresponding to a print job; instructions that cause the processor to execute the print job using a digital color press, comprising printing sheets of the print job to a stacker of the digital color press;
  instructions that cause the processor to generate a color target, wherein the color target is based on the received data;
  instructions that cause the processor to transmit the color target to a digital front end, wherein the digital front end at least partially controls the digital color press; and instructions that cause the processor to print the color target to a proof tray of the digital color press during the execution of the print job,
  comprising: instructions that cause the processor to specify an interval at which to print the color target, wherein the specified interval is based on at least one of a time interval and a sheet count interval;
  instructions that cause the processor to determine, during the execution of the print job, whether the print job is at the specified interval that is based on the at least one of the time interval and the sheet count interval; and instructions that cause the processor to, during the execution of the print job, if the print job is at the specified interval, then:
automatically transmit the color target to the digital front end;
and automatically print, at the specified interval, the color target to the proof tray of the digital color press during the printing of the sheets of the print job to the stacker of the digital color press;
wherein the color target has one or more color spaces; wherein the digital color press comprises a color measurement device; and wherein the plurality of instructions further comprises:
instructions that cause the processor to automatically measure the one or more color spaces using the color measurement device; instructions that cause the processor to automatically compare the measurements of the one or more color spaces with a reference set of color values to thereby determine one or more color variances;
instructions that cause the processor to determine whether the one or more color variances are within respective tolerances; and instructions that, if the one or more color variances are not within the respective tolerances, cause the processor to automatically adjust the digital color press.

11. The apparatus of claim 10, wherein the plurality of instructions further comprises:
instructions that cause the processor to generate a report on color stability based on the measurements of the one or more color spaces.

* * * * *